United States Patent
Stach (10) Patent No.: US 7,072,490 B2
(45) Date of Patent: Jul. 4, 2006

(54) SYMMETRY WATERMARK

(75) Inventor: John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 669 days.

(21) Appl. No.: 10/302,753

(22) Filed: Nov. 22, 2002

(65) Prior Publication Data

US 2004/0101157 A1   May 27, 2004

(51) Int. Cl.
    *G06K 9/00* (2006.01)

(52) U.S. Cl. ............... 382/100; 713/176; 348/460; 380/210

(58) Field of Classification Search ........... 380/210; 382/100, 232; 713/176
    See application file for complete search history.

(56) References Cited

U.S. PATENT DOCUMENTS

| | | | |
|---|---|---|---|
| 5,636,292 A | 6/1997 | Rhoads | |
| 5,835,639 A | 11/1998 | Honsinger et al. | |
| 5,859,920 A | 1/1999 | Daly et al. | |
| 6,266,452 B1 * | 7/2001 | McGuire | 382/294 |
| 6,563,937 B1 | 5/2003 | Wendt | |
| 6,795,565 B1 | 9/2004 | Wendt | |
| 6,845,170 B1 | 1/2005 | Wendt | |
| 6,865,273 B1 | 3/2005 | Wendt | |
| 2003/0012402 A1 * | 1/2003 | Ono | 382/100 |
| 2003/0099372 A1 * | 5/2003 | Wendt | 382/100 |
| 2004/0030899 A1 | 2/2004 | Lee et al. | |

FOREIGN PATENT DOCUMENTS

WO      WO02093930      11/2002

OTHER PUBLICATIONS

Kutter, "Watermarking Resisting to Translation, Rotation and Scaling,". SPIE vol. 3528, Nov. 1998, pp. 423-431.
Solachidis et al., "Circularly Symmetric Watermark Embedding in 2-D DFT Domain," ICASSP'99, Mar., 1999.

* cited by examiner

*Primary Examiner*—Amir Ahmed
*Assistant Examiner*—Anand Bhatnagar
(74) *Attorney, Agent, or Firm*—Digimarc Corporation (57) ABSTRACT

A digital watermark is generated with radial and circumferential symmetries in a particular domain of a host signal into which it is embedded. These symmetries enable a detector to compute the projective transformation and rotation angle of the embedded signal using only the symmetry properties. The embedded signal may be variable, such as being modulated with a variable message payload, yet the scale and rotation of this variable signal is detectable based on its symmetry properties.

20 Claims, 6 Drawing Sheets

SYMMETRY WATERMARK

TECHNICAL FIELD

The invention relates to digital watermarking.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 6,122,403, which are hereby incorporated by reference.

The invention provides methods and watermarking systems that embed and detect digital watermarks with radial and circumferential symmetry properties to make the watermarks robust to scaling and rotation.

One aspect of the invention is a method of digital watermark embedding in a two dimensional signal. This method generates a digital watermark signal carrying one more auxiliary data symbols to be embedded in the two dimensional signal. It embeds the digital watermark signal in the two dimensional signal such that the digital watermark has radial symmetry and circumferential symmetry. The circumferential symmetry enables detection of rotation of the digital watermark, and the radial symmetry enables detection of scaling of the digital watermark.

Another aspect of the invention is a method of detecting a symmetric digital watermark embedded in an image. The method computes radial symmetry in an embedding domain of the image to detect a radial symmetry property of the digital watermark. Based on the radial symmetry, it determines spatial scaling of the digital watermark as a function of rotation angle. It computes circumferential symmetry in an embedding domain to detect a circumferential symmetry property of the digital watermark. Based on use of the circumferential symmetry, it determines a rotation angle of the digital watermark.

By compensating for scale and rotation in this manner, the symmetry watermark is robust to rotation and scale. One particular implementation finds scale as a function of angle, which enables compensation for projective or perspective distortion. It then computes the rotation angle. The detector does not have to know the specific digital watermark signal, but instead, can proceed to detecting the radial and circumferential symmetries to compensate for rotation and scale. This digital watermark has self symmetries, such as mirror symmetry and/or symmetry through repetition of the signal, that enable geometric synchronization, and in addition, the symmetry watermark signal may be modulated with a variable data payload to carry variable data messages.

These digital watermark embedders and detectors may be implemented as software instructions, firmware, digital circuitry, or combinations thereof. In one software implementation, the embedder generates a digital watermark is generated with radial and circumferential symmetries in a particular domain of a host signal into which it is embedded, such as the frequency magnitude domain. These symmetries enable a detector to compute the projective transformation and rotation angle of the embedded signal using only the symmetry properties. The embedded signal is variable, such as a pseudorandom signal being modulated with a variable message payload, yet the scale and rotation of this variable signal is detectable based on its symmetry properties.

Further features will become apparent with reference to the following detailed description and accompanying drawings.

DETAILED DESCRIPTION

Figure 1:
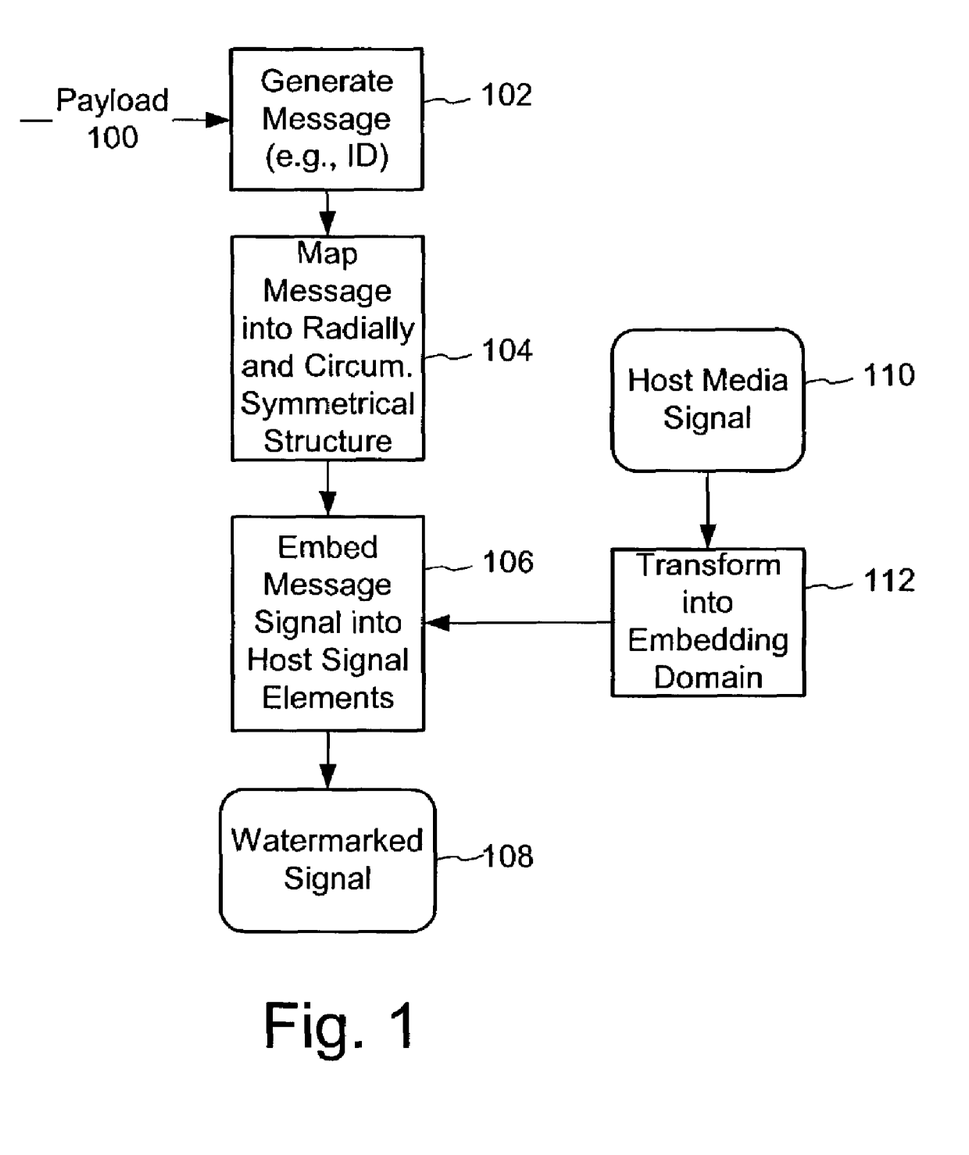
FIG. 1 is a flow diagram illustrating a method for embedding a digital watermark having radial and circumferential symmetries to make the watermark robust to geometric distortion.

FIG. 1 is a flow diagram illustrating a method for embedding a digital watermark having radial and circumferential symmetries to make the watermark robust to geometric distortion. For the sake of illustration, we describe this method as digital watermark embedder, which is implemented with programmatic instructions and/or hardware circuitry. The method starts with a message payload 100 to be embedded in a host media signal 110, such as a still image or video signal. The message payload comprises binary or M-ary message symbols, and is used to convey auxiliary data in the host signal. This auxiliary data can be used for a variety of applications, including authentication, carrying persistent identification or other metadata, dynamically linking to or indexing data, behaviors or programmatic actions in a database, carrying control instructions, etc.

While the level of robustness varies from application to application, the payload is typically transformed through error robustness coding to a longer signal. Some examples include repetition coding, error correction (convolution coding, block coding, turbo coding, etc.), M-ary modulation, binary modulation, spreading over a pseudorandom signal, modulating some other form of carrier signal, etc. These forms of message coding are generally represented within the message block 102 in FIG. 1.

Next, the embedder forms the message into a radially and circumferentially symmetric structure (104). Note that the formation of these symmetries can be combined with message generation, where repetition coding is used to form symmetries about circumferential and radial axes. Radially symmetry refers to symmetry in a radial direction (along the path of the radius of a circle) about a circular axis, such as the dashed circle depicted in FIG. 3, for example. Circumferential symmetry refers to symmetry in a circumferential direction (along the path of a circle) about a radial axis, such as the dashed lines in the radial directions in FIG. 3.

Figure 3:
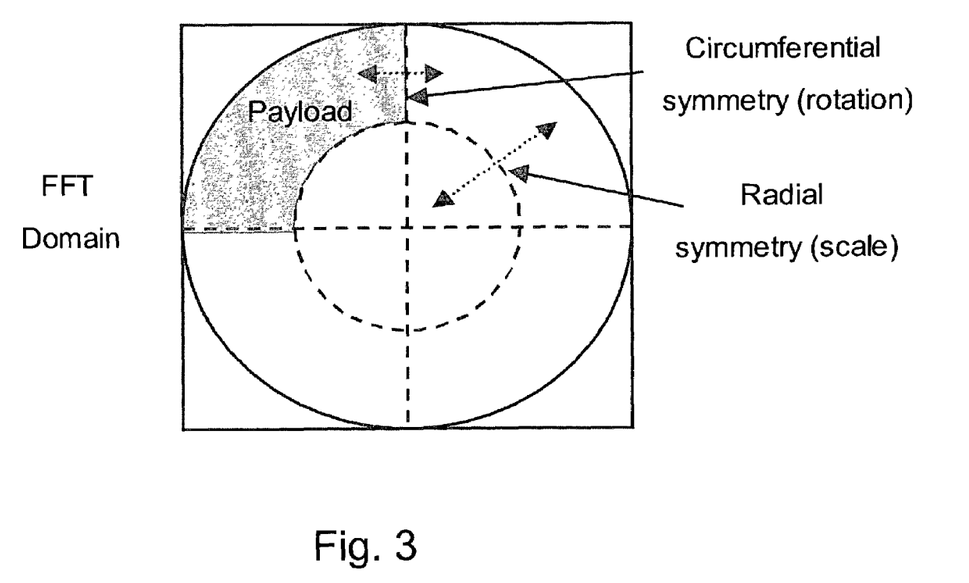
FIG. 3 is a diagram illustrating an example of circumferential and radial symmetries.

FIG. 3 illustrates only examples of many possible forms of radial and circumferential symmetry. With respect to radial symmetry, the example illustrates a form of radial symmetry where the axis of symmetry is a circle intersecting the midway point on the radius. This is a form of midway mirror symmetry. A repeating function or multiple symmetries may be used. Also, the watermark signal need not necessarily be designed to carry a variable message, but instead, may be generated solely to provide geometric synchronization. The watermark signal may be formed such that when correlated with itself in the radial direction, it produces a signal from which scale as a function of the angle can be derived.

With respect to circumferential symmetry, the same generalizations apply. The implementer may use any degree of symmetry, e.g., repeat every 90, 45 or 30 degrees, as long as the angle is evenly divisible into 360 degrees. Smaller symmetric sections may tend to provide more ambiguous results for calculating the geometric distortion. However, the robustness of the message payload may be enhanced when using smaller message payloads with more symmetric repetitions.

The symmetries could be mirror or repeated. In our method, these forms of symmetry are exploited in a similar way to find the scale and rotation parameters. However, the function used to generate the signal peaks from which the scale and rotation is derived is convolution for mirror symmetry (e.g., correlation of the watermarked signal and the reverse of that signal in the direction of symmetry), and correlation of the watermarked signal and itself in the direction of symmetry for repetition symmetry. In both cases, the detector need not know the specifics of the watermark signal; but instead, only the expected symmetry and which function (correlation or convolution) and embedding domain from which to detect the peaks due to the self symmetry of the watermark signal.

Next, the embedder embeds the message into host signal elements (106). This embedding method may take many forms, and we provide an example of one such approach later. In general, message embedding involves subtly varying the host signal elements such that the detectable attributes of the message signal persist in the host signal elements. As shown in FIG. 1, the embedder varies elements of the host signal in the embedding domain. This is illustrated in FIG. 1 in block 112, where the host media signal 110 is transformed into the embedding domain. The embedder modifies elements of the host signal in the embedding domain with the corresponding elements of the symmetric watermark message structure to form the watermarked signal 108.

The embedding domain refers generally to the features or attributes of the host signal that are modified to carry the auxiliary data of the message signal. One such example is the Fourier transform domain of the luminance component of an image, but there are many other attributes that can be modified. In some cases, the embedding domain is or can be approximated by a linear transformation of the host media signal. As such, the desired properties of the embedded watermark may be computed in an embedding domain, and then transformed into the original domain of the host signal for making equivalent modifications to the host signal to effect the embedding in the original domain of the host signal.

It is possible to use non-linear embedding methodologies to vary the host signal attributes as a function of the host signal and distortion channel to improve information capacity of the digital watermark based on knowledge of the host signal and the distortion channel. In such cases, the symmetries of the digital watermark can be exploited in the detector after performing pre-processing on the signal to map it into the embedding domain where these symmetries are expected to persist.

Figure 2:
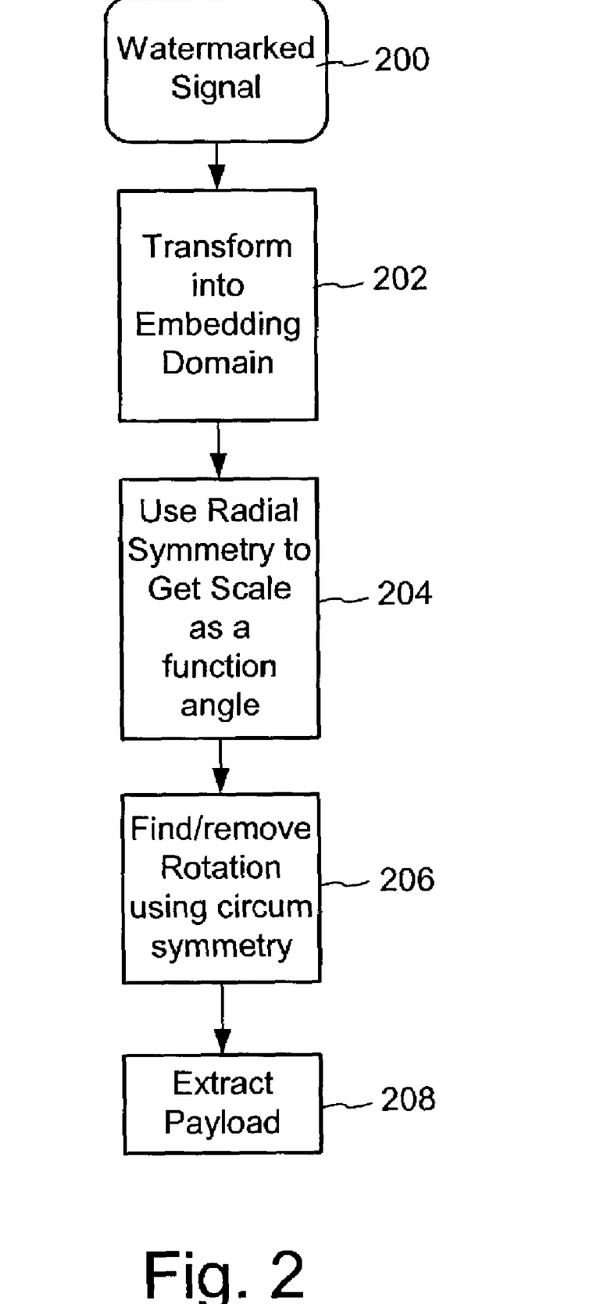
FIG. 2 is a flow diagram illustrating a method of reading a digital watermark using radial and circumferential symmetry to compensate for geometric distortion.

FIG. 2 is a flow diagram illustrating a method of reading a digital watermark using radial and circumferential symmetry to compensate for geometric distortion. For the sake of illustration, we describe this method as a digital watermark reader. The reader operates on a watermarked signal (200). In practice, the input signal to the detector may or may not have a watermark embedded in it. Thus, an optimized detector first analyzes whether a watermark is present based on evidence of the watermark, and finding such evidence, proceeds with more processing to extract the watermark. The reader begins by transforming the received signal, suspected of containing a watermark, into the embedding domain (202) (e.g., the spatial frequency domain of the luminance component).

Figure 6:
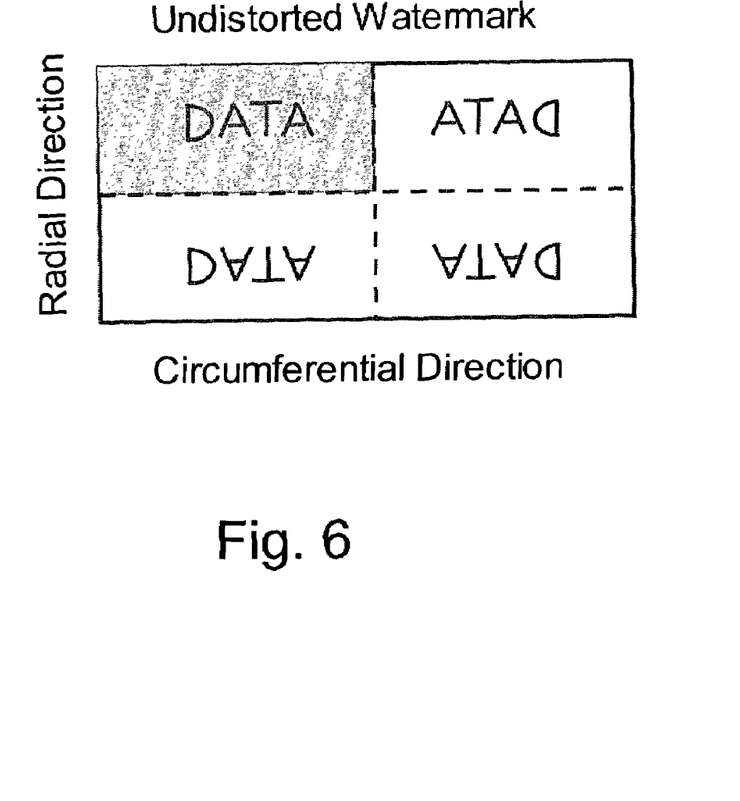
FIG. 6 illustrates an example of a rectangular remapping of a radially and circumferentially symmetric watermark before geometric distortion. The term, "DATA" is a graphical representation of the digital watermark signal structure, which may take many forms and is preferably imperceptible or unintelligible to humans in the perceptual domain of the host signal.
Figure 7:
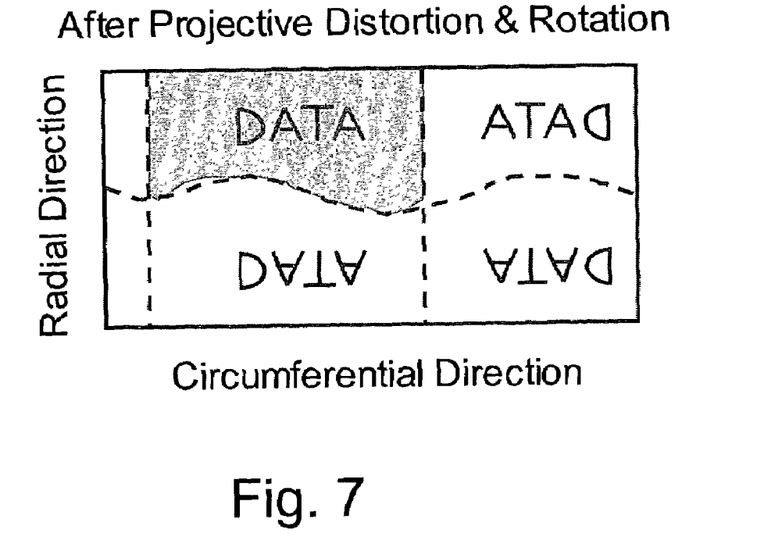
FIG. 7 illustrates the example shown in FIG. 6 after projective distortion.

Next, the reader analyzes the signal for radial symmetries introduced by the watermark. Geometric distortions, such as projective transformation, differential scaling and perspective transforms, tend to stretch or shrink the signal along a radial direction. This causes a detectable distortion of the radial symmetry, which is illustrated in FIGS. 6 and 7 as the distortion of the axis of radial symmetry. The reader detects the radial symmetry, assuming it is present, and gets the spatial scaling distortion as a function of the rotation angle (204). Once the spatial scaling distortion is computed it can be corrected before proceeding to the next stage.

Having corrected for scale distortion, the reader then proceeds to find and correct the rotation distortion using the circumferential symmetry (206). The rotational distortion appears as a shift in the axis of circumferential symmetry in the circumferential direction. A comparison of the undistorted and distorted watermarks in FIGS. 6 and 7 show an example of this shift. Detection of the circumferential symmetry reveals this shift, which corresponds to the rotation angle.

After correcting for rotation and scale, the reader proceeds to extract the payload (208). This process includes performing the inverse of the embedding operation to estimate elements of the message signal, and then perform the inverse of the robustness coding processes to recover the set of symbols comprising the message payload.

Referring to FIGS. 3–7, we now describe a more specific example of a digital watermark with radial and circumferential symmetries. In FIG. 3, the digital watermark message signal, illustrated as the portion labeled "Payload", has circumferential symmetry and radial symmetry in the Fourier domain of an image signal. This Fourier domain is computed using an FFT of an entire image or blocks of the image.

Figure 4:
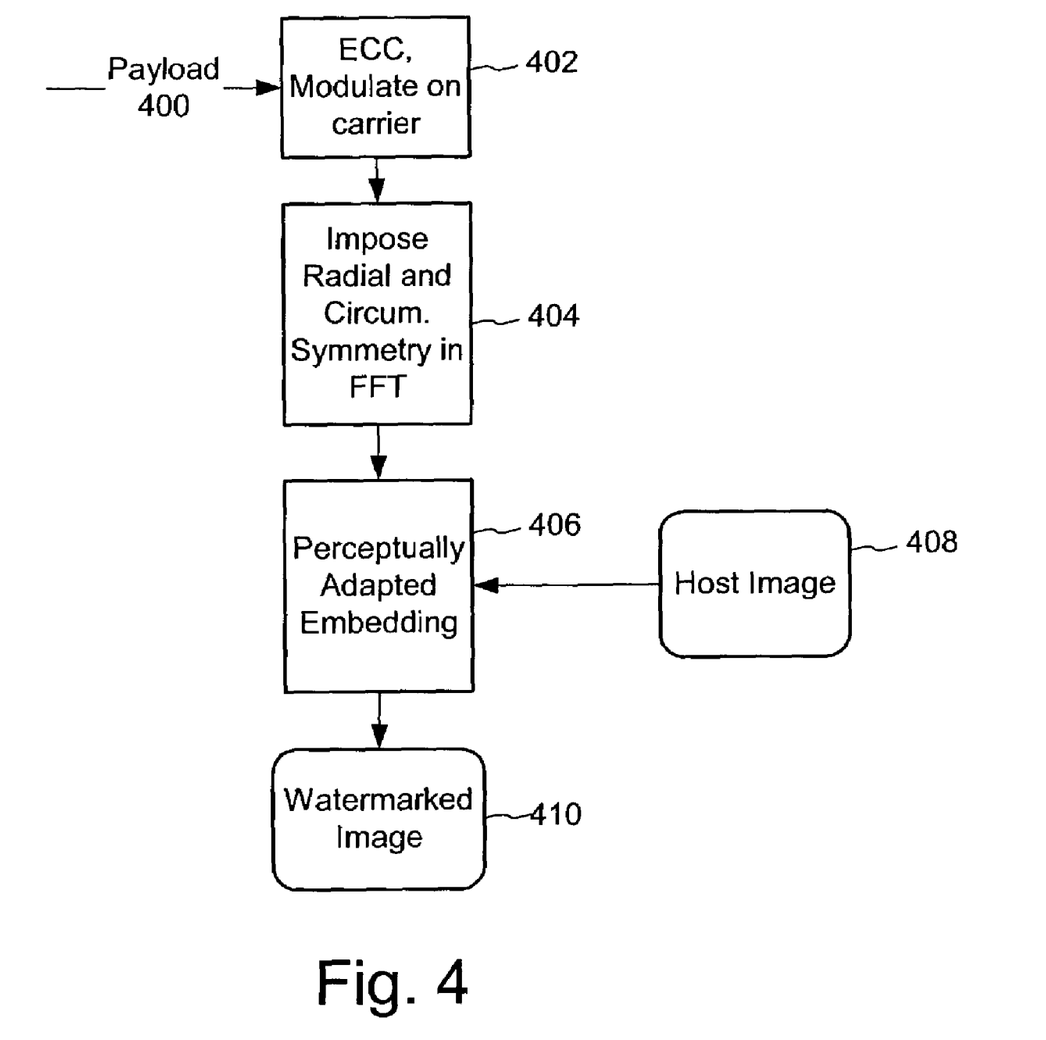
FIG. 4 is a flow diagram illustrating a method for embedding a digital watermark having radial and circumferential symmetries in the Fourier domain of an image.

FIG. 4 is a flow diagram illustrating a method for embedding a digital watermark having radial and circumferential symmetries in the Fourier domain of an image. In this example, the embedder starts with a payload of binary symbols and performs error correction to expand the signal into error correction coded symbols. Next, the coded symbols are spread onto carrier signals (402) (e.g., a pseudo-random carrier). The resulting signal elements are mapped to corresponding locations in a section of the Fourier domain, such as the shaded portion in the upper left quadrant shown in FIG. 3. In block 404, the embedder imposes symmetry by replicating the signal elements and mapping them to radially and circumferentially symmetric sections of the embedding domain as depicted in FIG. 3. The result, when mapped into a rectangular grid in the radial and circumferential directions appears as in FIG. 6, where the shaded portion represents the message signal spread onto its carrier. This shaded portion is mapped (e.g., repeated and flipped) to give it radial and circumferential symmetry.

In block 406, the symmetrically structured signal is embedded in the host image 408, preferably using perceptually adaptive embedding methods, such as those well documented in the watermarking literature. This creates the watermarked image (410) with hidden auxiliary data.

It is anticipated that the distortion channel through which the image will pass in a particular application will introduce projective and rotational distortion. The result to the host signal, and its embedded watermark, is to cause geometric distortion as depicted in FIG. 7.

Figure 5:
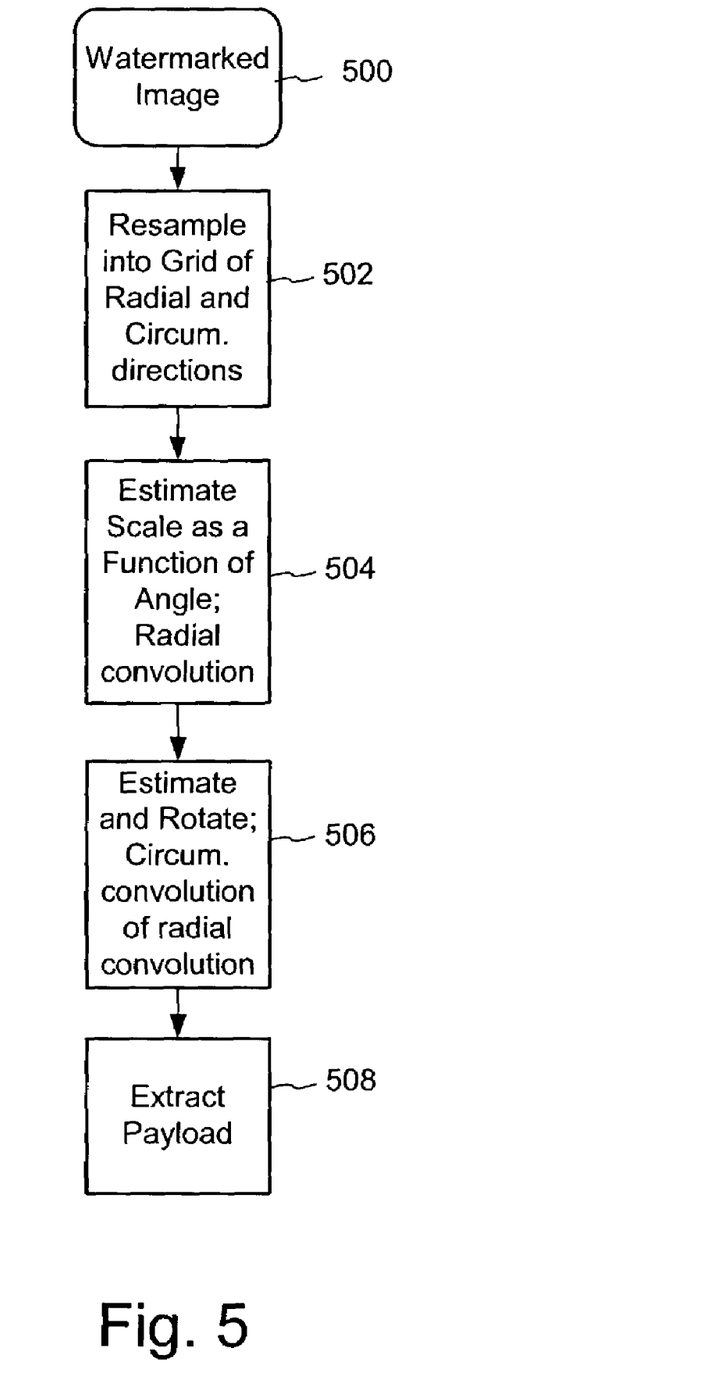
FIG. 5 is a flow diagram illustrating a method for detecting the digital watermark embedded by the method of FIG. 4.

FIG. 5 is a flow diagram illustrating a method for detecting the digital watermark embedded by the method of FIG. 4. The digital watermark reader operates on a potentially distorted image suspected of containing a watermark (500). First, the signal is mapped into the embedding domain, and resampled into a grid of radial and circumferential directions (502). In our example, the reader transforms the signal into the luminance channel, takes its FFT, and performs additional pre-processing to estimate the watermark signal. This pre-processing is dependent on the embedding method. In the case of an additive watermark signal, the pre-processor applies a prediction filter to extract an estimate of the watermark signal and/or remove host signal interference. In other embedding methods, the pre-processor extracts the watermark signal using the embedding function to map attributes of the received signal in the embedding domain into message signal estimates.

Next, the reader detects the radial symmetry to estimate and normalize the scale as a function of the rotation angle (504). By performing convolution of the signal in the radial direction, the reader finds the peaks in the convolution domain representing the radial symmetry. The location of these peaks at each angle provides an estimate of the scale at that angle.

Next, the reader performs a circumferential convolution of the normalized radial convolution domain (preferably in the region of the radial convolution peaks) (506). The location of peaks in the resulting transformation provides the rotation angle. In this manner, the reader finds the rotation angle, which enables it to correct for the rotation error. These convolution operations may be implemented using additional Fourier transformations of the input signals, performing the corresponding operations (e.g., multiplication) in the Fourier domain, and then computing the inverse Fourier transform. Similarly, in the case of repetition symmetry, the correlation operations may also be implemented in this fashion.

Having corrected for projective and rotational distortion, the reader proceeds to extract the payload by performing the inverse of the message generation process. In this example, message extraction includes dispreading of the error coded message symbols to form soft symbol estimates, and then inverse error correction coding (e.g., using Viterbi decoding to extract a message payload from a convolutionally coded message).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of digital watermark embedding in a two dimensional signal, the method comprising:
   generating a digital watermark signal carrying one more auxiliary data symbols to be embedded in the two dimensional signal; and
   embedding the digital watermark signal in the two dimensional signal such that the digital watermark has radial symmetry and circumferential symmetry; wherein the circumferential symmetry enables detection of rotation of the digital watermark, and the radial symmetry enables detection of scaling of the digital watermark.

2. The method of claim 1 wherein the two dimensional signal comprises an image signal, and the radial and circumferential symmetries are imposed in a transform domain of the image signal.

3. The method of claim 2 wherein the transform domain comprises a spatial frequency domain.

4. The method of claim 1 wherein generating the digital watermark comprises error robustness coding a multi-symbol message to form a coded message signal; and the method includes arranging the coded message signal in a pattern that has the radial and circumferential symmetry.

5. The method of claim 1 wherein the digital watermark is embedded such that a correlation or convolution of a domain of the watermarked signal produces peaks from which the rotation or scale is derived.

6. The method of claim 5 wherein the domain comprises a frequency domain.

7. The method of claim 5 wherein the domain comprises a polar mapped frequency domain.

8. A computer readable medium on which is stored instructions for performing the method of claim 1.

9. A method of detecting a symmetric digital watermark embedded in an image, the method comprising:
   computing radial symmetry in an embedding domain of the image to detect a radial symmetry property of the digital watermark;
   based on the radial symmetry, determining spatial scaling of the digital watermark as a function of rotation angle;
   computing circumferential symmetry in an embedding domain to detect a circumferential symmetry property of the digital watermark; and
   based on use of the circumferential symmetry, determining a rotation angle of the digital watermark.

10. The method of claim 9 wherein computing radial symmetry includes computing radial convolution of the image in the embedding domain.

11. The method of claim 10 wherein the spatial scaling is derived from peak locations in the radial convolution.

12. The method of claim 9 wherein computing circumferential symmetry includes computing circumferential convolution of the image in the embedding domain.

13. The method of claim 12 wherein rotation angle is derived from peak locations in the circumferential convolution.

14. The method of claim 9 including: using the rotation and scale to extract a variable message payload from the digital watermark.

15. The method of claim 9 wherein the embedding domain comprises a transform domain of the image.

16. The method of claim 15 wherein the embedding domain comprises a frequency domain transform of the image.

17. A computer readable medium on which is stored instructions for performing the method of claim 9.

18. The method of claim 9 wherein the image is part of a video signal.

19. A method of detecting a symmetric digital watermark embedded in an image, the method comprising:
   transforming the image into an embedding domain;
   computing radial symmetry of the image as a function of angle to detect signal energy attributable to radial symmetry of the digital watermark;
   computing circumferential symmetry to detect signal energy attributable to circumferential symmetry of the digital watermark;
   using the radial and circumferential symmetries to extract a message payload from the digital watermark.

20. A computer readable medium on which is stored instructions for performing the method of claim 19.

* * * * *